3,426,065
COMBINED SUBLIMATION-LEACHING PROCESS
Claiborne A. Duval, Jr., and Alvis B. Gainer, Beaumont, Tex., assignors to Mobil Oil Corporation, a corporation of New York
Filed June 23, 1964, Ser. No. 377,226
U.S. Cl. 260—525
Int. Cl. C07c 51/42
13 Claims The present invention relates to the purification of normally solid carboxylic acids by vaporization and condensation in combination with the selective extraction or leaching of impurities during condensation. In a particular embodiment it is concerned with the purification of terephthalic acid by sublimation and leaching.

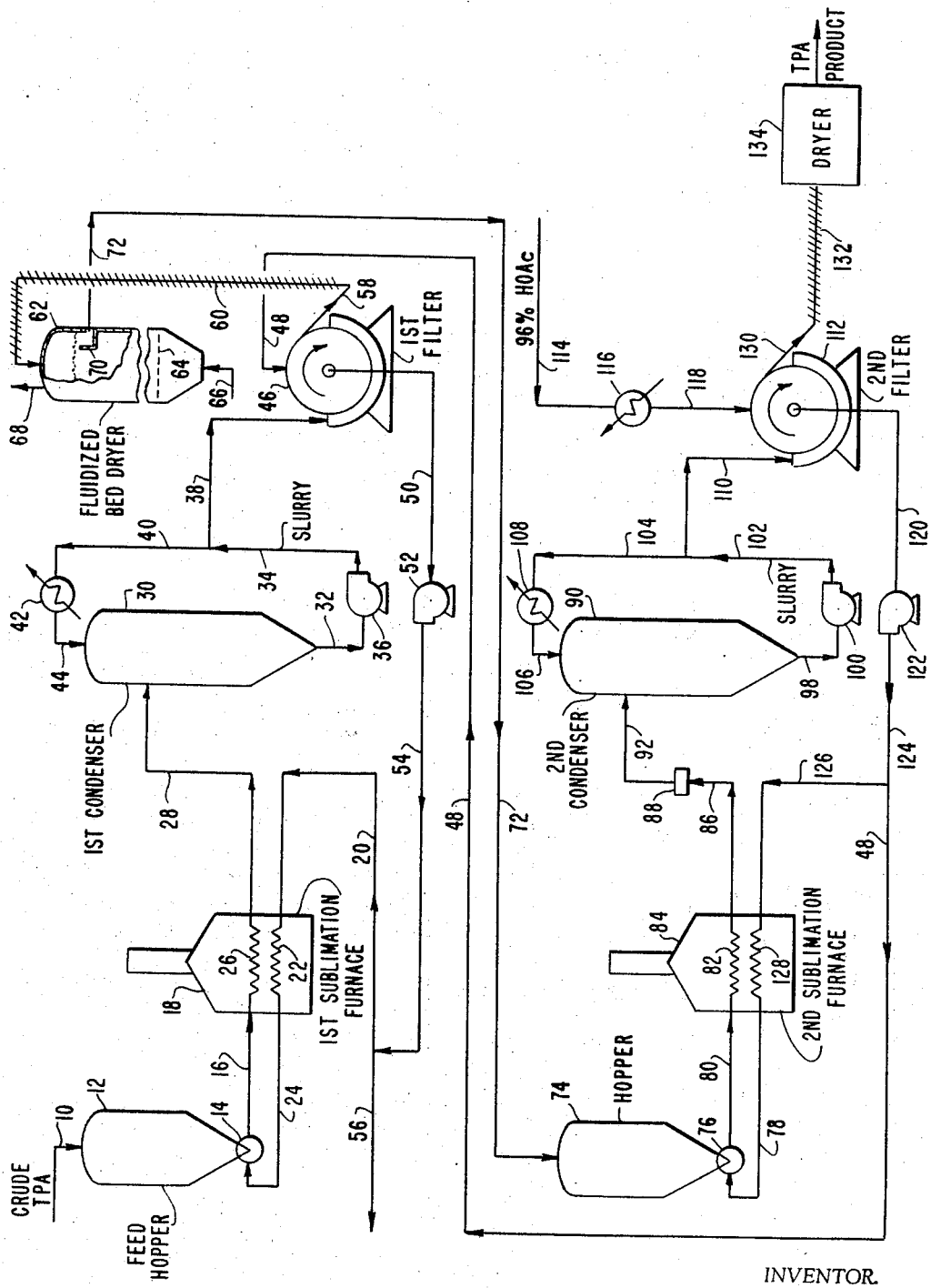

Terephthalic acid of high purity is required for certain purposes, such as the preparation of polyethylene terephthalate which is widely used in the manufacture of fibers, films, etc. While terephthalic acid can be economically produced on a large scale by the partial oxidation of p-xylene, numerous problems have been encountered in obtaining a product of sufficient purity at reasonable cost. Sublimation of the crude oxidation product by heating to temperatures above about 57° F. has been proposed for purification since terephthalic acid is one of the relatively few truly sublimable solids, that is, materials which vaporize upon heating and condense to solids upon cooling without passing through a liquid phase. However, difficulties arise in such sublimation inasmuch as incomplete oxidation by-produtcs are also volatilized and tend to be occluded or reoccluded in the terephthalic acid as it condenses. This is particularly true of the principal impurity, p - carboxybenzaldehyde (HOOC—$C_6H_4$—CHO) which has a melting point of about 480° F. and a normal boiling point of approximately 600° F. Other common impurities are p-toluic acid with a melting point of about 352° and an atmospheric boiling point of about 527° and terephthaldehyde (1,4-benzenedicarbonal) and both are also subject to occlusion in the condensing terephthalic acid. In addition, the terephthalic acid sublimate exhibits surface tackiness at temperatures above 450° F. and tends to stick to equipment walls. Such adhesion is highly undesirable as the sublimate in direct contact with a metal wall is discolored either by some catalytic effect or the higher local temperatures there, and this problem is particularly acute in the lower part of the condenser. Moreover, deposits are a great nuisance in continuous operations since provision must be made for shutting down and cleaning the equipment at frequent intervals. Attempts to leach out these occluded impurities with solvents have been only partially successful. Besides complicating the processing, they often involve relatively slow batch operations, high temperatures and high pressures in additional equipment of an expensive nature. Accordingly, there is a distinct need for an improved process for the purification of crude terephthalic acid and especially for one that facilitates continuous processing of this material.

It has been discovered that the purification of a vaporizable solid in admixture with vaporizable impurities can be substantially enhanced by vaporizing the mixture and simultaneously condensing and leaching the material undergoing condensation in intimate contact with a liquid organic solvent which selectively dissolves the foreign matter as it condenses and before most of it can be occluded in the condensing product. The solvent also serves as a direct heat exchange medium by cooling the vapor mixture in contact therewith and removing from the condensation zone at least a sizable proportion of the heat input of the vapor mixture.

The present invention is a process for purifying a vaporizable, normally solid acid which comprises heating an impure solid carboxylic acid to vaporize a mixture of said acid and at least one impurity associated therewith, condensing said vapor mixture by cooling it in contact with a selective liquid organic solvent to form a suspension of solid particles of said acid in said solvent while dissolving at least a major proportion (i.e., more than half) of said vaporized impurity in said solvent, and thereafter separating said solid particles from the resulting solution.

Other features of the invention relate to condensing at least a major proportion of said vaporized acid in the liquid medium and the use of a solvent in which the weight ratio of the solubilities of said impurity and said acid at condensation temperatures is substantially greater than the original ratio of said substances in the vapor mixture; and desirably utilizing a solvent in which the solubility of said impurity is at least about 0.3% by weight and the solubility of said acid is less than about 10% under condensation conditions, the preferred solubilities being at least about 2% for the impurity and less than about 2% for said acid. Still other aspects of the invention are concerned with the types and species of acids subjected to vaporization, various types and species of suitable selective solvents, the presence of water in the condensing liquid medium, substantially total condensation of vaporized solids in the liquid medium, the use of vaporized solvent as a gaseous carrier for the vaporized solids, utilizing a recycle slurry or suspension containing previously condensed solid particles of acid as the liquid medium, maintaining intimate contact of the liquid solvent with said vapor mixture throughout the condensation, repeating the process in a multistage operation for higher product purity, cascading the solvent employed in one condensation stage back to the preceding condensation stage and regulating the condensation conditions to provide a maximum temperature of the liquid medium within 300° F. of the vaporization temperature of said acid.

The instant process is suitable for purifying any vaporizable (i.e., convertible to a vapor without decomposition upon heating), normally solid carboxylic acid containing foreign matter in the form of one or more impurities that tend to vaporize along with the acid upon heating. It is particularly effective in the purification of sublimable acids and its major utility currently appears to involve purifying polycarboxylic acids, especially the aromatic ones, as exemplified by terephthalic acid and isophthalic acid. The latter compound may also be prepared by a partial oxidation process with m-xylene as the charge.

Conditions in the vaporization zone depend, of course, on the characteristics of the material being vaporized. The temperature therein may range from the sublimation point or boilng point of the material at the existing pressure up to about 50° F. higher, but care should be exercised to avoid any temperatures at which decomposition of the material takes place. Although either subatmospheric or elevated pressures may be utilized in many instances, pressures in the neighborhood of atmospheric pressure are usually preferable. For example, in the case of the terephthalic acid sublimation, the temperature in the vaporization zone may range from about 580 to 740° F. and a pressure of from 0 to 1 pound per square inch gauge (p.s.i.g.) is generally preferred.

An entrainer or carrier gas or vapor is desirable to aid in transporting the vaporized solids from the vaporization zone to the condensation zone, particularly for maintaining a constant rate of flow of the vaporized solids. When the material to be vaporized is in powdered form, this same gaseous carrier may be employed to entrain and carry the powder into the vaporization chamber or coil. A variety of inert gases or vapors, such as steam and nitrogen, may be used, but normally liquid materials are preferred where the condenser is being operated on a total condensation basis. There is a distinct advantage in heating some of the same liquid medium used in the condensation-leaching step to the vapor state and using this material as the gaseous carrier in order to minimize the number of agents present in the system. Typical rates charging entrainer gas run from about 2 to 35 standard cubic feet (s.c.f.) of the gas per pound of vaporizable solids, but 100 s.c.f. or more may be used. In general, the lowest gas rate that will provide suitable entrainment is recommended for economical reasons.

In quenching the vaporized solids and leaching the solid condensate, a liquid medium is used and it is important that there be intimate contact of the vapor and the resulting condensate with this liquid phase medium throughout the condensation step. For example, the evaporation of all of this liquid solvent from solid particles of the desired product would deposit on those particles the dissolved impurities contained in the solvent and also allow vaporous impurities to condense on those particles, all of which impurities might become occluded within the solid product particles. Another important feature of this invention is the use of a solvent which selectively dissolves the impurity or impurities in preference to the acid being purified. Ideally, the solvent would dissolve none of the product acid while all impurities associated with the acid would be infinitely soluble in the solvent at all conceivable condensation conditions, including wide ranges of temperatures. However, such ideal solvents are not required, even if they exist, for the present condensation-leaching operation may be carried out with any liquid organic solvent in which the weight ratio of the solubilities of at least one impurity and of the product acid respectively at condensation temperatures is substantially greater than the original weight ratio of those substances in the vapor mixture. For example, the ratio of solubilities may be at least about twice, and preferably at least about 10 times, the ratio in the vapor mixture. Although it is sometimes desirable that the solubility of the acid in the solvent should be less than that of one or more of the associated impurities, this is not essential in the novel process. From a practical standpoint, it is usually desirable that the solubility of the acid product should be less than about 10% by weight and the solubility of the foreign matter should be at least 0.3% in the solvent to obviate the need for handling excessive volumes of the solvent. Preferably, the solubility of the acid is below about 2% and the solubility of the impurities amounts to at least about 2%.

The liquid medium may contain a single one or a plurality of organic solvents. The nature of these will depend on the particular acid undergoing purification and the various impurities which are to be extracted. In addition, the solvent should not react with the acid under process conditions. The stability, availability, cost and corrosiveness of the solvent may influence the choice in some instances. Accordingly, it is not feasible to list categories of solvents for general use.

For purposes of illustration, a number of the many organic solvents suitable for the treatment of terephthalic acid may be mentioned. These include tetrahydrofuran, p-xylene, ketones, such as methyl ethyl ketone and methyl isobutyl ketone and especially the aliphatic monocarboxylic acids, as exemplified by formic, acetic, propionic, butyric, valeric, caproic, caprylic and capric acids. All of these are inert in that they do not react with terephthalic acid even at high temperatures. In addition, each of these solvents dissolves an appreciable amount of p-carboxybenzaldehyde but, at most, a relatively limited quantity of terephthalic acid. Various advantages are obtained in using different solvents. Acetic acid is miscible with water, relatively inexpensive and an excellent solvent for leaching p-carboxybenzaldehyde from terephthalic acid. P-xylene simplifies operations somewhat since the same material is used as a raw material in producing the terephthalic acid. The ketones and p-xylene are relatively noncorrosive even at elevated temperatures, thus inexpensive, conventional construction materials may be employed in the processing equipment. The higher boiling fatty acids (e.g. caprylic acid) permit utilizing higher temperatures in the condensation zone without using elevated pressures; moreover, these acids are readily washed out of the terephthalic acid product with acetic acid.

In some instances, the liquid medium may also contain a minor amount of water, such as about 2% to 45% of the total weight of the liquid medium, in order to avoid dehydration of certain acids at the elevated temperatures. In the case of terephthalic acid purification, especially where acetic acid is employed as the selective solvent, it is desirable to have a water content of at least about 2% and preferably about 4% in the liquid medium in order to preclude the formation of some terephthalic anhydride or of acetic anhydride, and this also applies to other selective solvents. In general, nothing is to be gained by adding more water than is necessary to avoid dehydration, since that merely increases the amount of liquid to be handled without any corresponding benefits. It is also usually desirable to keep the concentration of liquids in the liquid medium substantially constant. To this end the same liquid medium may be employed in the vapor state as an entrainer gas to carry the vaporized solids into the condensation zone. While a homogeneous liquid medium is preferred for many purposes, especially in view of the simplicity in handling it, a mixture of immiscible liquids may be used, for example, p-xylene and a minor amount (i.e., less than half) of water. In such cases, the liquid may be withdrawn from the lower end of the condenser at two levels at appropriate rates and then commingled to preserve the same proportions for recirculation of further processing.

Conditions in the condensation zone may vary greatly depending upon the number of significant factors including the characteristics of the vaporized solids, the characteristics of the quenching liquid and also the type of condenser employed. Temperatures within the condenser may be controlled by regulating the temperatures and charging rates of the vapor stream and the condensing liquid. In the present purification process, a relatively slow condensation of vaporized solids and growth as solid particles at relatively high temperatures appears to be desirable. Accordingly, it is usually recommended that the quenching temperature be maintained at as high as is feasible for the selected quenching liquid.

The condensation temperature is necessarily below the boiling point of liquid medium under the prevailing pressure in order to maintain a liquid phase in the condenser for the leaching action. If desired, the condenser and the vaporizer may be operated at elevated pressures to permit the use of quenching solvents at temperatures above their normal boiling points. In general, where all other considerations are equal, it is desirable to condense the vaporized solids at a temperature within about 300° F. of the sublimitation point or boiling point of the material being purified and even within a 100° of that point wherever practicable. As an illustration of suitable conditions for the condensation of vaporized terephthalic acid, the condensation temperatures may range from about 100 to 500° F., the residence time of this material in the condenser is desirably between about 0.1 and 100 seconds and atmospheric pressure is generally preferred to higher or lower pressures. The aforesaid temperatures refer to the temperature of the product slurry leaving the bottom of the condenser prior to any cooling.

The flow of the liquid medium should be adequate to maintain the intimate contact of the liquid with the vapor undergoing condensation throughout the entire condensation period. It is also desirable that this liquid should thoroughly bathe the walls of the condenser to minimize or eliminate the deposition of solids on the walls. Such volumes of liquid are readily available by merely cooling and recirculating a large part of the product slurry with due provision for preventing the slurry from becoming saturated with the impurities which are being removed from the vaporized solids.

Conventional equipment may be employed in dispersing the liquid medium sufficiently to produce the necessary intimate contact of the vapor and liquid phases. For example, the condenser may be a vertical tower packed with either regular, irregular or geometric shapes of inert solid material over which the solvent is uniformly distributed by sprays or distributing trays; or a bubble cap tower provided with the usual trays for the liquid may be used, or it may be an unobstructed column in which a shower of the solvent is maintained by downward, horizontal or upward sprays of the liquid from spray nozzles in one or more locations at the top or sides of the column. Also, various combinations of these features may be built into a single vessel.

With either a bubble cap or a packed section, an upward flow of the condensing vapor stream from an inlet in the lower section of the condenser countercurrent to the descending quenching solvent is ordinarily used; while with spray condensation, the flow of the two streams may be either concurrent or countercurrent. Condensation of the vapor mixture by a shower of liquid medium in unobstructed condenser space is generally preferred, especially where a slurry of condensed sublimate is being recirculated. This technique minimizes or eliminates any tendency toward the accumulation of solid deposits in the condenser, since there are no small passages likely to be plugged by solids and a better washing of the condenser walls by the liquid occurs.

Separation of the condensed solids from the product slurry is ordinarily accomplished by filtration. For continuous operations, a rotary drum filter is particularly suitable in view of the ease of washing the accumulated product cake while still on the filter surface with a fresh supply of the solvent. Woven fiber glass cloth may be used as the filtering medium. Although filtration under elevated pressures may be desirable in some instances, vacuum filtration in an enclosed filter is usually preferred. Such filtration may be performed at any temperature that allows a substantial liquid phase to be retained during filtration, and the product slurry may be cooled prior to filtering it. In the particular case of terephthalic acid condensed in a 96% acetic acid solution, the temperatures typically may range from about 100° F. up almost to the boiling point of the liquid phase in the filter, and the preferred pressure is about 1 to 2 p.s.i. absolute.

The present process may involve either a single stage or a multistage operation in which the material undergoing purification is vaporized, condensed and separated in each stage. A far more highly purified product is obtainable in multistage operations since the percentage reduction in soluble foreign matter is usually about the same in each stage. In addition, a different liquid medium may be used in each condensation stage in the multistage process. This technique may provide maximum extraction efficiency in some instances for the removal of each of a plurality of impurities. However, for most purposes a single liquid medium is recommended for a multistage process as this permits more efficient leaching or extraction of the soluble impurities by cascading the liquid medium from the later stages of the process to the earlier stages thereof; moreover, it simplifies the process.

Many benefits are obtained by the instant process. By releasing occluded impurities from the crude material by vaporization and then dissolving them in a condensing and leaching liquid medium before these impurities can again be occluded in the product, a product of high purity is obtainable in high yields and continuous operations are feasible. The dissolved impurities in many instances may be recycled back to the basic production process as part of the feed thereto with a consequent increase in efficiency. In addition, the new process of total condensation requires less condensing equipment than is necessary in a fractional condensation process. Also, the new process is considerably faster than prior art leaching operations and lends itself to multistaging for obtaining higher purity products than can usually be produced by multiple leaching operations. For a better understanding of the nature and objects of this invention, reference should be had to the accompanying drawing which is a flow sheet or schematic representation of a system suitable for practicing one embodiment of the present invention in the form of a continuous process. For greater clarity many apparatus details, particularly valves, instruments, controls, accessories, other auxiliary equipment, etc., have been omitted from the drawing as they are well understood in the art.

Turning now to the drawing, crude terephthalic acid is charged through conduit 10 to feed hopper 12 as a dry powder. This material is produced by the partial oxidation of p-xylene and is optionally but desirably subjected to a preliminary purification by leaching with hot acetic acid; nevertheless it still contains a small but unacceptable percentage of impurities, principally p-carboxybenzaldehyde occluded within the terephthalic acid.

From a rotating screw feeder 14 at the bottom of hopper 12, the powdered terephthalic acid is picked up by a rapidly moving stream of vaporized acetic acid liquor containing 4% by weight of water at a temperature of about 300° F. and carried in suspension through the pipe 16 to the first stage sublimation furnace 18. This acetic acid is obtained via line 20 from the filtrate of the first stage filtration described later, and it is passed through the heating coil 22 in furnace 18 where it is vaporized prior to passing through pipe 24 to the bottom feeder of hopper 12. From line 16 the suspension of terephthalic acid particles in the gaseous carrier is introduced into another heating coil 26 in furnace 18 where the terephthalic acid and the vaporizable solid impurities associated therewith are completely vaporized as the temperature of the stream is raised to 690° F. A well insulated pipe 28 then carries the vapor stream without significant drop in temperature into the upper portion of the first stage condenser 30.

Inside the condenser or quenching vessel, the vapor stream entering from line 28 is always in intimate contact with a cooler quenching solvent in liquid phase as the vaporized solids are totally condensed therein. This intimate contact between the vapor and liquid phases throughout the entire condensation of the vaporized solid substances is important in promoting the selective solubilization of the impurities in the vapor stream, as it minimizes the occlusion or reocclusion of these impurities in the terephthalic acid particles as they grow in size from the small terephthalic acid nuclei initially condensed. Condenser 30 is a vertical tower with an unobstructed interior in which a shower of the liquid medium is sprayed downwardly from spray nozzles in a plurality of locations at the top and in the upper section of the column. These nozzles are inset in the wall of the vessel 30 to minimize any tendency for solids to condense on the sides of the relatively cool nozzles. There is no substantial tendency for solid deposits to form or grow on the interior surfaces of the condenser by reason of the continual washing of these surfaces by the sprayed liquid. As the vapor stream moves downward concurrently with the falling drops of the liquid medium which serves as both a quenching agent and a selective solvent, the vaporized solids are cooled more and more and they gradually condense over a substantial interval in contact with the drops of liquid, for the quenching of the vapor does not occur instantaneously.

Condensing the vapor stream in this sublimation operation produces a slurry of solid terephthalic acid particles suspended in a solution of the impurities, such as p-carboxybenzaldehyde, in the 96% acetic acid which now also contains the acetic acid employed as an entraining or carrier vapor. This hot slurry is continuously withdrawn from the bottom of condenser 30 in line 32 and forced upward through pipe 34 by pump 36. A stream 38 is taken off from line 34 for further processing, as described hereinafter, and this withdrawal corresponds on a weight basis to the rate of introduction of vapor from line 28 into condenser 30. The balance of the slurry is recycled through pipe 40, heat exchanger 42, and line 44 connected to the top of this condenser for recirculation of the slurry through the condensation zone. Surprisingly, it is generally necessary to heat the recycle stream, for the vapor stream 28, despite its high temperature, has a low heat content and its heat input is usually inadequate to maintain a sufficiently high temperature in the condensation system. Heat exchanger 42 serves to regulate the temperature in the condensation zone by heating the slurry stream 40 from a temperature of 180° to 230° F. The concentration of suspended terephthalic acid and dissolved impurities in the slurry is regulated by adjusting the rates of supplying vaporized acetic acid liquor in line 24 and of feeding the terephthalic acid charge from the bottom of hopper 12, but it may sometimes be desirable to accomplish this regulation by introducing 96% acetic from another source into line 40 at a controlled rate.

The first stage product slurry is carried by the pipe 38 to the first stage filter 46. This unit is a completely enclosed vacuum filter of the rotary drum type. First, the acetic acid liquor is removed from the slurry; then the filter cake is washed with 96% acetic acid liquor obtained from the second stage filtrate via line 48. The first stage filtrate is withdrawn through pipe 50 by means of suction pump 52 and conveyed through conduit 54 which delivers a part of this acetic acid solution to the first sublimation furnace 18 through branch line 20 for vaporization to form the gaseous carrier and the balance to line 56 for reuse in the preliminary oxidation process. Excess acetic acid in the latter stream is eventually recovered by distillation and the solute therein is returned to the oxidation reactor.

In filter 46 the cake of washed solid terephthalic acid is scraped off the drum and discharged through a chute 58 to an enclosed screw conveyor 60 which is preferably disposed horizontally. This conveyor not only transports the solid material to the fluidized bed dryer 62 but also functions as a seal preserving the vacuum in filter 46 which typically operates at a pressure of about 2 p.s.i. absolute.

Dryer 62 is a vessel of substantial depth containing a precolating bed of finely divided terephthalic acid supported on a perforate plate 64 through which acetic acid vapor containing 4% moisture vapor is rising at a rate sufficient to maintain the bed in a fluidized condition. This drying gas is admitted through line 66 at the bottom at a temperature of 300° F. and it exits through pipe 68 at the top of the vessel after passing through a cyclone, (not shown) for removing entrained solid particles from the exhaust vapor. A substantial part of the exit gas is reheated and recirculated through the dryer. The excess gas, corresponding in quantity to the vapor derived from the acetic acid liquor adhering to the solids charged to the dryer, is removed and condensed to recover the acetic acid. The wet terephthalic acid drops from conveyor 60 into the bed in the form of relatively large agglomerates of smaller particles and these aggregates disintegrate into fluidized powder as the acetic acid liquor is evaporated by the hot vapor. The dry powder at the top of the bed spills over a weir 70 and is transported through conduit 72 to the hopper 74 for the second sublimation stage.

In general, the second sublimation is carried out in a manner very similar to that employed in the first stage, except that the terephthalic acid charge contains a smaller amount of foreign matter and the 96% aqueous acetic acid is fresher and thus contains less of the aforesaid impurities in solution. The dry terephthalic acid powder is introduced at a controlled rate by the rotating screw feeder 76 at the bottom of the hopper 74 into a stream of 96% acetic acid vapor at 300° F. from pipe 78 for transportation through line 80 to the vaporization coil 82 in the second sublimation furnace 84. The charge is substantially completely vaporized in the coil, leaving it at a temperature of 690° F.; then it passes through line 86 and filter 88 on its way to the second condenser 90 via line 92. Ash, including residues of metals and other unvaporized material, is removed by the filter in order to exclude these contaminants from the final product. The transfer lines and filter between the second furnace and condenser are heavily insulated so that the reduction in temperature is negligible and condensation is avoided.

Operating conditions in the second condenser 90 are the same as in the first with the total condensation of the vaporized solids being effected in intimate contact with a shower of cooler acetic acid from spray nozzles located in the wall at or near the top of the condenser. The resulting slurry is withdrawn from the tapering bottom of this vessel in line 98 and pump 100 supplies the necessary pressure for recirculating part of this material back to the condenser via lines 102, 104 and 106 while heat exchanger 108 heats the slurry to the quenching temperature. The flow of liquid through the tower is maintained at a constant rate and a product stream is taken off from pipe 102 in line 110 at a rate corresponding to the rate of condensation in the condensing zone which in turn corresponds to the rate of feeding material into the condenser from charge line 92.

The slurry delivered by line 110 is filtered in the second vacuum filter 112 which is the same type as filter 46. The filter cake is washed here also, but with a substantially pure stream of fresh makeup and redistilled acetic acid containing 4% water. This acid is brought in via supply line 114 and heated to a temperature of 225° F. by heat exchanger 116 prior to being delivered via line 118 to a spray manifold (not shown) which sprays the hot liquid onto the filter drum to wash the filter cake thereon. The filtrate, including both wash acid and the quenching liquid from the second condenser, from this filter is withdrawn through line 120 by suction pump 122 for distribution through pipe 124. One branch line 48 supplies part of this filtrate as wash liquor to the first stage filter and branch pipe 126 conveys another part of the liquid for use as the second stage entraining agent in line 78 after it has been vaporized by passing through the heating coil 128 of the second sublimation furnace 84. As the cake of wet terephthalic acid solids is scraped off the drum of filter 112, it is discharged down the sealed chute 130 to the horizontal screw conveyor 132 which transports the material to dryer 134 for evaporation of the acetic acid adhering to the solid material. Various types of dryers, such as the fluidized bed dryer described earlier, may be employed here. A dry terephthalic acid powder of high purity is discharged from the dryer as the product of the process.

In the aforementioned two-stage sublimation process, the p-carboxybenzaldehyde content of the terephthalic acid is reduced about 90% in each stage for a total removal of approximately 99% of this impurity. Drying is employed between the two stages to provide a material which passes steadily through the feeder without interruption at a constant rate and which is also readily transported by the entrainer gas. The acetic acid used throughout the system contains the minimum water content of 4% for optimum results in order to minimize pumping and equipment costs. By maintaining a constant acid-water ratio and employing this liquid medium in the vapor state as a gaseous carrier, dilution of the acid is avoided and this greatly simplifies recovery operations as well as the makeup and blending of fresh and redistilled acid to replace that lost in the process. Titanium vaporizer coils are employed in this particular embodiment of the process and the condenser is desirably of glass-lined or ceramic construction to minimize the corrosive effect of hot acetic acid and its vapors but other materials may be used at lower temperatures, such as stainless steel or aluminum.

The examples which follow serve to illustrate a number of the principles of the present invention. Illustrative examples are designated by numerals while two examples designated by the letters A and B are included for purposes of comparison.

Comparative Example A

A crude terephthalic acid is prepared by the partial oxidation of p-xylene and thereafter washed thoroughly with acetic acid. Upon analysis this material is found to contain 15,000 parts per million (p.p.m.) by weight of p-carboxybenzaldehyde. This raw product is purified by sublimation using a mixture of equal volumes of nitrogen and steam as the gaseous carrier for transporting the vaporized solid substances to a condensing vessel in which they are totally condensed by contact with a large volume of fine spray of a circulating slurry of previously condensed terephthalic acid sublimate in water. The exit temperature of the slurry at the bottom of the condenser is maintained at 200° F. and the uncondensed nitrogen is withdrawn from an exhaust line at the top of the condenser. After filtering off a portion of the circulating slurry and washing it in acetic acid, this product is dried and found to contain 5850 p.p.m. of p-carboxybenzaldehyde.

Example 1

The procedure of Comparative Example A is repeated exactly except for circulating a slurry of the terephthalic acid sublimate in acetic acid diluted by previously condensed steam and adjusting the cooler for the slurry to maintain a bottom temperature in the condenser of 180° F. After washing the product briefly in acetic acid and drying, the terephthalic acid is found to contain only 3850 p.p.m. of p-carboxybenzaldehyde. It is apparent that the simultaneous condensation and leaching in the presence of aqueous acetic acid provides a far more efficient purifying action than condensation in water alone.

Example 2

The procedure of Comparative Example A is again repeated using the same material and entrainer gas except that the combined condensation and leaching takes place in refluxing acetic acid, and acetic acid is added occasionally to clear the condenser of condensed terephthalic acid. In addition, the temperature of the slurry at the bottom of the condenser is maintained at 244° F. This slurry is filtered at 180–200° F. and none of it is recirculated. Upon analysis, the dried terephthalic acid product is determined to have a p-carboxybenzaldehyde content amounting to 3500 p.p.m.

Example 3

A previously sublimed terephthalic acid having a p-carboxybenzaldehyde content of only 380 p.p.m. is sublimed again using the apparatus and carrier gas of the previous examples with the condensation being effected in a circulating slurry of the sublimate in acetic acid while the bottom condenser outlet temperature is held at 180–200° F. After filtering off and washing the condensed terephthalic acid on the filter with acetic acid, then drying the solids, the p-carboxybenzaldehyde content of the resulting product is found to amount to only 90 p.p.m. Accordingly, it is evident that the combination condensation-leaching technique of this invention is applicable to purifying relatively pure substances as well as those which are much more heavily contaminated.

Examples 4–6 and B

The examples set forth in detail in the following table depict the results obtainable in small scale equipment using various carrier gases, quenching temperatures (measured at the bottom of the condenser) and liquid media in the condenser. The raw materials here are two terephthalic acid crudes prepared in the same manner by partial oxidation followed by a preliminary leaching by stirring in liquid acetic acid in a pressure vessel at 450 to 500° F. at elevated autogenous pressure for two hours in a batch operation. Comparative Example B is a control experiment in which the terephthalic acid charge is not sublimed (and hence not condensed) but merely leached by slurrying with the caprylic acid at 300° F. for 30 minutes before being filtered, washed with acetic acid, dried and analyzed. In this tabulation, terephthalic acid and p-carboxybenzaldehyde are designated by the abbreviations TPA and PCB, respectively.

| Example | TPA Charge PCB Content in p.p.m. | Entrainer Gas Composition, percent by volume | Quench Conditions Liquid | Quench Conditions Temp., °F. | TPA Product PCB Content in p.p.m. | TPA Product Percent Reduction in PCB |
|---|---|---|---|---|---|---|
| 4 | 2,550 | 54% N₂, 44% HOAc, 2% Steam | Acetic Acid–TPA Slurry | 170–180 | 678 | 74 |
| 5 | 2,550 | 54% N₂, 23% HOAc, 23% Steam | do | 220–230 | 478 | 81 |
| 6 | 2,550 | 100% N₂ | Caprylic Acid–TPA Slurry | 300 | 265 | 90 |
| B | 2,050 | None | Caprylic Acid (leaching only) | 300 | 1,290 | 37 |

In reference to the above examples, the successive and substantial improvements in purification obtained in the combined condensation-leaching operation are attributed to the increasing quench temperatures which are thought to produce a slower formation and growth of solid terephthalic acid particles and consequently a longer time for the liquid medium to dissolve condensed p-carboxybenzaldehyde before it can be occluded in the terephthalic acid particles. Comparative Example B demonstrates that a simple leaching operation yield a far less pure product than the combination of leaching with a sublimation step, since the PCB reduction of only 37% produced by leaching is in sharp contrast with the 90% reduction obtained in the combination process.

Although certain specific illustrations have been set forth herein for the purpose of fully describing this invention, it will be apparent to those skilled in the art that many other modifications and embodiments of the process are included within the purview of this invention. Accordingly, the present invention should not be regarded as restricted in any respect except as may be recited in the appended claims or required by the prior art.

We claim:

1. A process for purifying a normally solid acid which comprises heating an impure vaporizable solid benzene carboxylic acid to vaporize a mixture of said acid and at least one impurity associated therewith, condensing said vapor mixture by cooling it in contact with a selective liquid organic solvent to form a suspension of solid particles of at least a major proportion of said vaporized acid in said solvent while dissolving at least a major proportion of said vaporized impurity in said solvent, and thereafter separating said solid particles from the resulting solution.

2. A process for purifying a normally solid acid which comprises heating an impure vaporizable solid benzene polycarboxylic acid to vaporize a mixture of said acid and at least one impurity associated therewith, condensing said vapor mixture to form a suspension of solid particles of at least a major proportion of said vaporized acid in a liquid medium while dissolving at least a major proportion of said vaporized impurity in said medium by cooling said vaporized mixture in contact with a selective liquid organic solvent in which the weight ratio of the solubility of said impurity relative to the solubility of said acid at condensation temperatures is substantially greater than the original weight ratio of said substances in said vapor mixture, and thereafter separating said solid particles from the resulting solution.

3. A process according to claim 2 in which the solubility of said impurity is at least about 0.3% by weight and the solubility of said acid is less than about 10% in said solvent under the conditions prevailing during condensation.

4. A process according to claim 2 in which said acid is terephthalic acid.

5. A process according to claim 2 in which said solvent comprises an aliphatic monocarboxylic acid.

6. A process according to claim 2 in which said liquid medium contains a proportion of water sufficient to prevent the dehydration of carboxylic acids.

7. A process according to claim 2 in which said acid is terephthalic acid and said solvent comprises an aliphatic monocarboxylic acid containing from 1 to 10 carbon atoms per molecule.

8. A process according to claim 2 in which said vapor mixture comprises terephthalic acid and p-carboxybenzaldehyde and said liquid medium comprises a major proportion of acetic acid and at least about 4% by weight of water.

9. A process according to claim 2 in which said vapor mixture is substantially totally condensed in said liquid medium.

10. A process according to claim 2 in which said solvent is maintained in intimate contact in the liquid phase with said vapor mixture throughout the condensation of particles of said acid.

11. A process according to claim 2 in which a portion of said solvent is employed in the vapor state for transporting said vaporized mixture from a vaporization zone to a condensation zone.

12. A process according to claim 2 in which the condensation conditions are regulated to provide a maximum temperature of the liquid medium within 300° F. of the vaporization temperature of said acid at atmospheric pressure.

13. A continuous multistage sublimation purification process which comprises the steps of vaporizing a solid mixture of terephthalic acid and p-carboxybenzaldehyde with heat in an initial sublimation stage, condensing substantially all of the resulting vapor mixture to form a suspension of terephthalic acid particles and a solution of p-carboxybenzaldehyde in a liquid medium containing at least about 2% by weight of water and a proportion of an aliphatic monocarboxylic acid having between 1 and 10 carbon atoms per molecule sufficient to dissolve at least a substantial amount of p-carboxybenzaldehyde by cooling said vapor mixture in intimate contact with said liquid medium throughout the condensation step, and separating said terephthalic acid particles from said solution by filtration, a portion of said liquid medium being employed in the vapor state as a carrier for transporting said vapor mixture from a vaporization zone to a condensation zone and another portion of said liquid medium being introduced into contact with said vapor mixture in the form of a slurry of terephthalic acid sublimate in a solution which is not more than partially saturated with p-carboxybenzaldehyde; and repeating said steps at least once in at least one separate sublimation stage with said filtered terephthalic acid particles.

References Cited

UNITED STATES PATENTS

| 1,686,913 | 10/1928 | Jaeger | 260—525 |
| 2,857,429 | 10/1958 | Bruson et al. | 260—525 |
| 2,923,736 | 2/1960 | Maclean | 260—525 |
| 1,694,124 | 12/1928 | Jaeger | 260—525 |

FOREIGN PATENTS

| 767,463 | 2/1957 | Great Britain. |

JAMES A. PATTEN, *Primary Examiner.*

J. H. NIELSEN, *Assistant Examiner.*